US008847058B2

(12) United States Patent
Shinoda

(10) Patent No.: US 8,847,058 B2

(45) Date of Patent: Sep. 30, 2014

(54) SIGNAL PROCESSING DEVICE AND STRINGED INSTRUMENT

(75) Inventor: Ryo Shinoda, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 215 days.

(21) Appl. No.: 13/049,782

(22) Filed: Mar. 16, 2011

(65) Prior Publication Data

US 2011/0226119 A1 Sep. 22, 2011

(30) Foreign Application Priority Data

Mar. 18, 2010 (JP) ................................ 2010-063307

(51) Int. Cl.

*G10H 1/06* (2006.01)

*G10H 3/18* (2006.01)

(52) U.S. Cl.

CPC ............... *G10H 3/186* (2013.01); *G01H 1/125* (2013.01); *G10H 2210/271* (2013.01)

USPC ............................................... 84/736; 84/623

(58) Field of Classification Search

USPC ............................................................ 84/736

See application file for complete search history.

(56) References Cited

U.S. PATENT DOCUMENTS 6,448,488 B1 * 9/2002 Ekhaus et al. .................. 84/735

2009/0173218 A1 7/2009 Kuroki

FOREIGN PATENT DOCUMENTS

JP 2005-024997 A 1/2005

OTHER PUBLICATIONS

Notice of Reason for Rejection issued Feb. 18, 2014, for Japanese Patent Application No. 2010-063307, with English translation, 13 pages.

* cited by examiner

*Primary Examiner* — Christopher Uhlir

(74) *Attorney, Agent, or Firm* — Morrison & Foerster LLP

(57) ABSTRACT

A signal processing device is composed of a signal acquisition unit and a signal processing unit. The signal acquisition unit acquires a signal corresponding to a vibration propagated from a string attached to a stringed instrument from a pickup element that picks up the signal corresponding to the vibration. The signal processing unit includes a filter that performs convolution operation using a filter coefficient set in the filter, the signal processing unit applying the convolution operation to the acquired signal through the filter and outputting a processed signal. The filter is set with the filter coefficient corresponding to a transfer function which has a frequency response developing a plurality of peak waveforms corresponding to resonance of a body of another stringed instrument different from the stringed instrument within a specific frequency range and which allows components of the peak waveforms to decay more rapidly than a component of a fundamental sound in the vibration of the string in the processed signal.

9 Claims, 9 Drawing Sheets

| MODEL | TRANSFER FUNCTION |
|---|---|
| G0 | $Php(t)^{-1}$ |
| G1 | Bhm(t)_1 |
| G2 | Bhm(t)_2 |
| G3 | Bhm(t)_3 |
| G4 | Bhm(t)_4 |
| G5 | Bhm(t)_5 |

FIG. 11

| MODEL | TRANSFER FUNCTION |
| --- | --- |
| G1 | IRpm (t)_1 |
| G2 | IRpm (t)_2 |
| G3 | IRpm (t)_3 |
| G4 | IRpm (t)_4 |
| G5 | IRpm (t)_5 |

SIGNAL PROCESSING DEVICE AND STRINGED INSTRUMENT

BACKGROUND OF THE INVENTION

1. Technical Field of the Invention

The present invention relates to a technology for imparting a stringed instrument's resonance effect to an audio signal.

2. Description of the Related Art

Some stringed instruments such as guitars are equipped with a pickup which uses a piezoelectric element to output vibration propagated from a string as an electrical signal. The electrical signal is amplified and output through a speaker, allowing the user to listen to the guitar's sound at an amplified volume. However, the sound, which is output as the electrical signal generated through the piezoelectric element, includes almost none of the resonance components generated by the body or the like of the guitar. Accordingly, sound reproduced from the electrical signal gives the listener a different impression from sound generated by playing an acoustic guitar or the like.

Japanese Patent Application Publication No. 2005-24997 describes a technology in which convolution operation is performed on the electrical signal through a Finite Impulse Response (FIR) filter to add a resonant sound of the body to the signal.

In the technology described in Japanese Patent Application Publication No. 2005-24997, when convolution operation is performed so as to reproduce a resonant sound of the body of a guitar of a certain model, the generated sound is heard as if the resonant sound of the body is added to the sound, unlike when convolution operation is not performed. However, the generated resonant sound is heard as being totally different from a resonant sound of the body of a guitar of a specific model, which the user desires to reproduce. This difference becomes more noticeable when convolution operation is performed on an electrical signal output from a guitar of a different model from a guitar of a model whose resonant sound the user desires to reproduce.

SUMMARY OF THE INVENTION

The invention has been made in view of the above circumstances and it is an object of the invention to improve accuracy of reproduction of a resonant sound of a body of a different stringed instrument from a stringed instrument, to which a string is attached, when convolution operation has been performed to add the resonant sound of the body of the different stringed instrument to an electrical signal representing vibration propagated from the string attached to the stringed instrument.

To achieve the above object, the invention provides a signal processing device comprising: a signal acquisition unit that acquires a signal corresponding to a vibration propagated from a string attached to a stringed instrument from an output element that outputs the signal corresponding to the vibration; and a signal processing unit including a filter that performs convolution operation using a filter coefficient set in the filter, the signal processing unit applying the convolution operation to the acquired signal through the filter and outputting a processed signal, wherein the filter is set with the filter coefficient corresponding to a transfer function which has a frequency response developing a plurality of peak waveforms corresponding to resonance of a body of another stringed instrument different from the stringed instrument within a specific frequency range and which allows components of the peak waveforms to decay more rapidly than a component of a fundamental sound in the vibration of the string in the processed signal.

In a preferred embodiment, the signal processing unit has another filter which performs convolution operation using a filter coefficient set in said another filter, and applies the convolution operations to the acquired signal using both the filters thereby outputting the processed signal, said another filter being set with the filter coefficient effective to suppress signals other than vibration components of the string in the acquired signal.

Preferably, said another filter is set with the filter coefficient corresponding to an inverse function of a transfer function of the vibration observed while the vibration is generated by the string and outputted as the signal from the output element, thereby enabling said another filter to suppress signals other than the vibration components of the string.

In another preferred embodiment, the signal processing device further comprises: an information acquisition unit that acquires first information associated with an inverse function of a transfer function of the vibration observed while the vibration is generated by the string and outputted as the signal from the output element, and that acquires second information associated with a transfer function of a sound which is generated by a string of another stringed instrument different from the stringed instrument and which is received after undergoing resonance of said another stringed instrument, and a setting unit that calculates a transfer function based on the first information and the second information acquired by the information acquisition unit and sets a filter coefficient corresponding to the calculated transfer function in the filter, the calculated transfer function having a frequency response developing a plurality of peak waveforms corresponding to resonance of the body of said another stringed instrument different from the stringed instrument appears within a specific frequency range, and allowing components of the peak waveforms to decay more rapidly than a component of a fundamental sound in the vibration of the string in the processed signal.

The invention also provides a signal processing device comprising: a signal acquisition unit that acquires a signal corresponding to a vibration propagated from a string attached to a stringed instrument from an output element that outputs the signal corresponding to the vibration; a signal processing unit including a filter that performs convolution operation using a filter coefficient set in the filter, the signal processing unit applying the convolution operation to the acquired signal through the filter, and outputting a processed signal; an information acquisition unit that acquires first information associated with an inverse function of a transfer function of the vibration observed while the vibration is generated by the string and outputted as the signal from the output element, and that acquires second information associated with a transfer function of a sound observed while the sound is generated by a string of another stringed instrument different from the stringed instrument and received after undergoing resonance of said another stringed instrument; and a setting unit that calculates a transfer function based on the first information and the second information acquired by the information acquisition unit and sets a filter coefficient corresponding to the calculated transfer function in the filter, the transfer function allowing the signal processing unit to output the processed signal reproducing a sound that has undergone resonance of said stringed instrument.

In a preferred embodiment, the signal processing device further comprises a storage unit that stores the first information, wherein the information acquisition unit acquires the first information from the storage unit.

The invention also provides a signal processing device comprising: a signal acquisition unit that acquires a signal corresponding to a vibration propagated from a string attached to a stringed instrument from an output element that outputs the signal corresponding to the vibration; a signal processing unit including one filter that performs convolution operation using a filter coefficient set in said one filter and another filter that is set with a filter coefficient effective to suppress signals other than vibration components of the string in the acquired signal, the signal processing unit applying the convolution operation to the acquired signal through both said one filter and said another filter and outputting a processed signal; an information acquisition unit that acquires information associated with a transfer function of a sound observed while the sound is generated by a string of another stringed instrument different from the stringed instrument and received after undergoing resonance of said another stringed instrument; and a setting unit that sets a filter coefficient corresponding to the transfer function acquired by the information acquisition unit in said one filter.

In a preferred embodiment, said another filter is set with a filter coefficient corresponding to an inverse function of a transfer function of a vibration observed while the vibration is generated by the string and outputted as the signal from the output element, thereby allowing said another filter to suppress signals other than the vibration components of the string.

The invention also provides a stringed instrument comprising: a string; an output element that outputs a signal corresponding to a vibration propagated from the string; and the signal processing device according to the invention.

According to the invention, it is possible to improve accuracy of reproduction of a resonant sound of a body of a different stringed instrument from a stringed instrument, to which a string is attached, when convolution operation has been performed to add the resonant sound of the body of the different stringed instrument to an electrical signal representing vibration propagated from the string attached to the stringed instrument.

BRIEF DESCRIPTION OF THE DRAWINGS

FIG. 11 illustrates setting information in Modification 1 of the invention.

DETAILED DESCRIPTION OF THE INVENTION

Embodiments

[Exterior Configuration]

Figure 1:
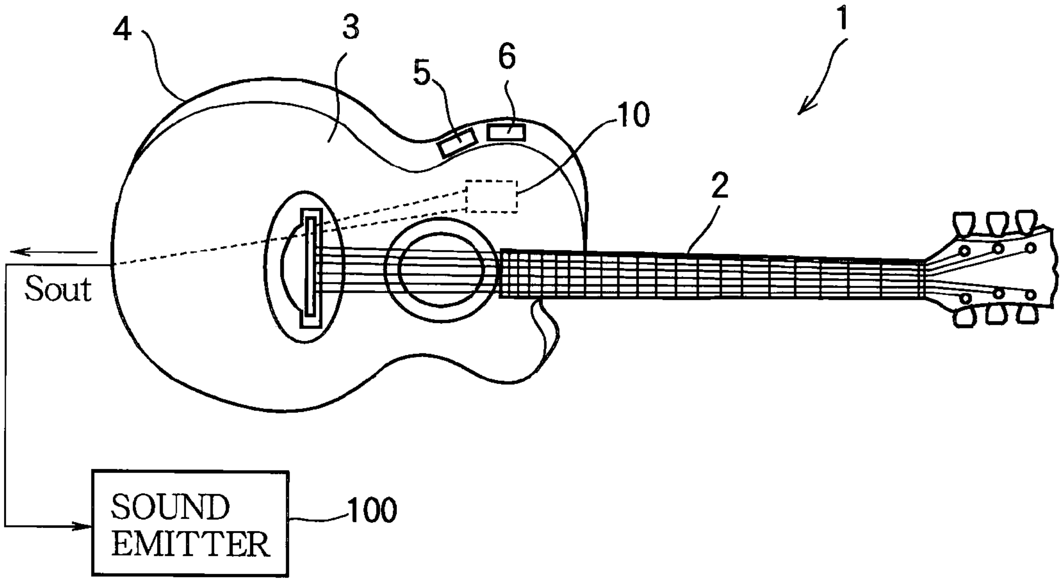
FIG. 1 illustrates an exterior of a guitar according to an embodiment of the invention.

FIG. 1 illustrates an exterior of a guitar 1 according to an embodiment of the invention. The guitar 1 is a stringed instrument constructed by mounting a signal processing device 10, a manipulation unit 5, and an interface 6 to an acoustic guitar including strings 2, a pickup 3, and a body 4. The guitar 1 need not be an acoustic guitar and may be an electric guitar or the like. The guitar 1 may also be a guitar which does not have the body 4.

The guitar 1 includes a terminal through which an audio signal Sout output from the signal processing device 10 is provided to an external device. The terminal is connected to a sound emitter 100 including a speaker, an amplifier, and the like through a shielded line or the like. Through this connection, the guitar 1 provides the audio signal Sout to the sound emitter 100 to emit a corresponding sound.

The pickup 3 is an output unit that includes a piezoelectric element and converts vibration of a string 2, which has propagated to the pickup 3, into an electrical signal (hereinafter referred to as an "audio signal Sin") through the piezoelectric element.

The manipulation unit 5 includes a rotary switch, a manipulation button, and the like and outputs, upon receiving a signal corresponding to user manipulation on the manipulation unit 5, information indicating details of the manipulation. The manipulation unit 5 may also include a display for displaying a menu screen or the like.

The interface 6 is connected to an external device and exchanges information with the external device. For example, the interface 6 includes a slot into which a recording medium including a nonvolatile memory is inserted and reads data stored in the inserted recording medium and outputs the read data to the signal processing device 10. The interface 6 may be connected to another device through wireless or wired communication.

The signal processing device 10 acquires the audio signal Sin output from the pickup and information output from the manipulation unit 5 and the interface 6. A configuration of the signal processing device 10 is described below with reference to FIG. 2.

[Configuration of Signal Processing Device 10]

Figure 2:
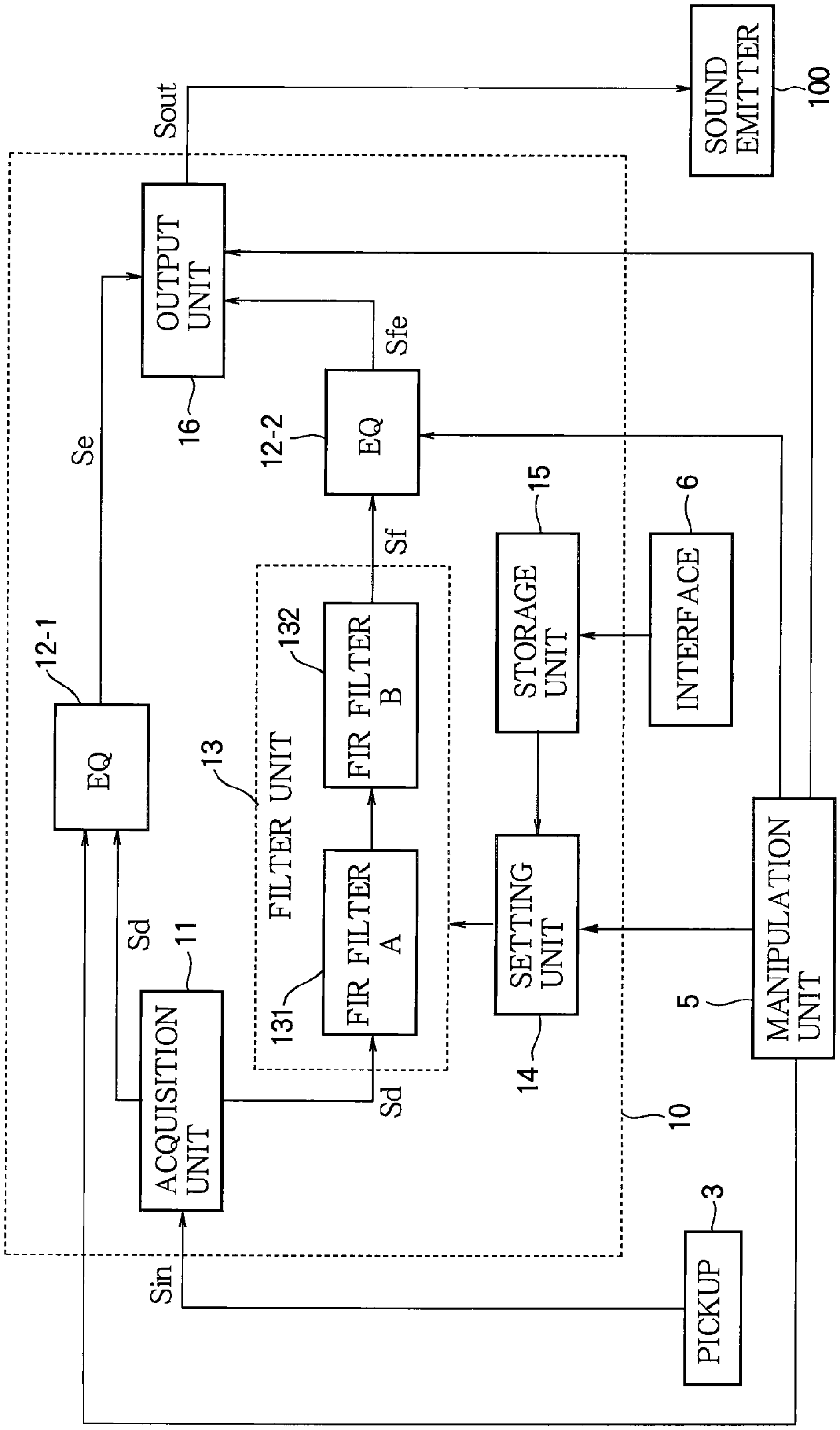
FIG. 2 is a block diagram illustrating the configuration of a signal processing device according to an embodiment of the invention.

FIG. 2 is a block diagram illustrating the configuration of the signal processing device 10 according to an embodiment of the invention. The signal processing device 10 includes an acquisition unit 11, equalizers (EQ) 12-1 and 12-2, a filter unit 13, a setting unit 14, a storage unit 15, and an output unit 16.

The acquisition unit 11 acquires an audio signal Sin output from the pickup 3 and converts the audio signal Sin from analog to digital and outputs the resulting audio data Sd to the equalizer 12 and the filter unit 13.

Each of the equalizers 12-1 and 12-2 is a parametric equalizer, a graphic equalizer, or the like, and functions to perform an equalization process according to setting data. The equalizer 12-1 performs an equalization process on the audio data Sd and outputs audio data Se. The equalizer 12-2 performs an equalization process on audio data Sf output from the filter unit 13 according to setting data so as to output audio data Sfe. The setting data of the equalizers 12-1 and 12-2 is set based on user manipulation of the manipulation unit 5.

The filter unit 13 includes an FIR filter A 131 and an FIR filter B 132. The filter unit 13 is a signal processing unit that performs convolution operation on the received audio data Sd sequentially through the FIR filter A 131 and the FIR filter B 132 using filter coefficients set in the FIR filter A 131 and the FIR filter B 132 and outputs audio data Sf. Here, the filter unit 13 may perform convolution processes through both the FIR filter A 131 and the FIR filter B 132 in reverse order. That is, the FIR filter B 132 may first perform a convolution process on the audio data and the FIR filter A 131 may then perform a convolution process on the resulting signal. Although the FIR filter has been described as an example, it is possible to use a different filter, provided that transfer functions described below can be realized.

Filter coefficients of the FIR filter A 131 and the FIR filter B 132 are set through the setting unit 14.

The setting unit 14 reads and acquires information associated with a transfer function with reference to setting information stored in the storage unit 15 and sets filter coefficients corresponding to the transfer function in the FIR filter A 131 and the FIR filter B 132 of the filter unit 13. In this manner, the setting unit 14 functions as both an information acquisition unit that acquires information associated with a transfer function and a setting unit that sets filter coefficients. The setting information is described below with reference to FIG. 3.

Figures 3, 4:
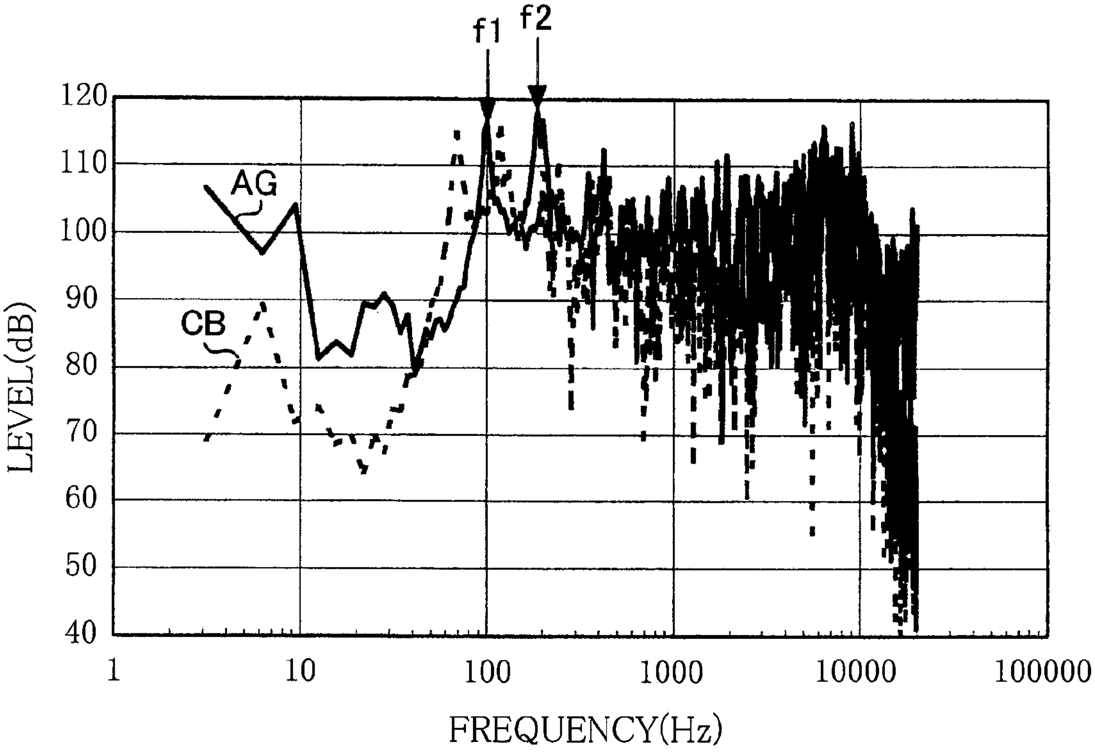
FIG. 3 illustrates setting information according to an embodiment of the invention.
FIG. 4 illustrates a frequency response of a transfer function IRpm(t) at a specific time according to an embodiment of the invention.

FIG. 3 illustrates setting information according to an embodiment of the invention. Information associated with transfer functions corresponding to guitar models is registered in the setting information. The information associated with a transfer function is information required to specify the transfer function. A model "G0" indicates the model of the guitar 1 and models "G1" to "G5" indicate other models. Here, one of the models "G1" to "G5" may be the same as the model "G0", i.e., the model corresponding to the guitar 1.

The transfer function registered in association with the model "G0" is an inverse function $Php(t)^{-1}$ of a transfer function Php(t) of a sound generated from the string 2 of the guitar 1 until the sound is output as an audio signal Sin from the pickup 3. Namely, $Php(t)^{-1}$ is an inverse function of a transfer function Php(t) of the vibration observed while the vibration is generated by the string 2 and outputted as the signal Sin from the output element 3. This transfer function Php(t) is calculated, for example, by striking the bridge part of the guitar 1 with an impulse hammer and analyzing an audio signal Sin output from the pickup 3 as an impulse response. The transfer function may be calculated using not only the calculation method employing an impulse hammer but also any other known calculation method. Information associated with the transfer function Php(t) rather than information associated with the inverse function $Php(t)^{-1}$ may also be registered in the setting information. In this case, the setting unit 14 converts the transfer function Php(t) to the inverse function.

Each of the transfer functions registered in association with the models "G1" to "G5" is a transfer function Bhm(t) of a sound generated from a string of a guitar of a corresponding model until the sound is received by a predetermined sound receiving point after undergoing resonance of the body or the like of the guitar. Namely, Bhm(t) is a transfer function of a sound observed while the sound is generated by a string of another stringed instrument different from the stringed instrument 1 and received by a microphone after undergoing resonance of said another stringed instrument. Although the transfer functions of the models "G1", "G2", . . . , and "G5" are denoted by "Bhm(t)_1", "Bhm(t)_2", . . . , and "Bhm(t)_5", each may also be denoted simply by "Bhm(t)". Each of the transfer functions "G1" to "G5" is calculated, for example, by striking the bridge part of a guitar of the corresponding model with an impulse hammer and analyzing a sound, which is received by a microphone positioned at a predetermined receiving point such as a specific distance in front of the guitar, as an impulse response. The transfer function Bhm(t) may be calculated using not only the calculation method employing an impulse hammer but also any other known calculation method as described above.

The above is a description of details of the setting information.

The setting unit 14 reads the transfer function $Php(t)^{-1}$ corresponding to the model "G0" with reference to the setting information and sets filter coefficients corresponding to the transfer function $Php(t)^{-1}$ in the FIR filter A 131. In this example, the filter coefficients that are set in the FIR filter A 131 are determined to be those corresponding to the transfer function $Php(t)^{-1}$. Thus, the setting unit 14 need not perform setting of the filter coefficients in the FIR filter A 131 since the filter coefficients are preset in the FIR filter A 131.

Setting of the filter coefficients in the FIR filter A 131 allows the FIR filter A 131 to output audio data, in which signal components other than vibration components of the string 2 are suppressed, by performing convolution operation on the input audio data Sd. Signal components other than vibration components of the string 2 are the result of, for example, the electrical characteristics of the pickup 3, the structure of the body 4 of the guitar 1 to which the string 2 is attached, and the like. Therefore, when ideal filter coefficients are set in the FIR filter A 131, audio data output from the FIR filter A 131 includes vibration components of the string 2 extracted from the audio data Sd. Namely, the FIR filter A 131 convolutes the input audio data Sd with the inverse function $Php(t)^{-1}$ so as to suppress signals other than the vibration components of the string 2.

The setting unit 14 reads a transfer function Bhm(t) corresponding to a model specified by the user through manipulation of the manipulation unit 5 with reference to the setting information and sets filter coefficients corresponding to the read transfer function Bhm(t) in the FIR filter B 132.

Setting of the filter coefficients in the FIR filter B 132 allows the FIR filter B 132 to output audio data Sf, to which resonance components of a guitar of the specified model have been imparted, by performing convolution operation on audio data input to the FIR filter B 132. Namely, the FIR filter B 132 convolutes the input audio data Sd with the transfer function Bhm(t) to provide the output audio data Sf developing a plurality of peak waveforms corresponding to resonance of the body of another stringed instrument different from the stringed instrument 1 within a specific frequency range.

The audio data input to the FIR filter B 132 includes extracted vibration components of the string 2 attached to the guitar 1 as described above. Accordingly, the audio data Sf is obtained by imparting resonance of the guitar of the model specified by the user to the vibration of the string 2 attached to the guitar 1 rather than to sound of the audio signal Sin (audio data Sd) output from the pickup 3. Therefore, it is possible to improve accuracy of reproduction of the resonant sound of the body or the like of the guitar of the specified model, compared to when convolution operation is merely performed on the audio signal Sin (audio data Sd) output from the pickup 3.

Setting the filter coefficients in the FIR filter A 131 and the FIR filter B 132 as described above allows the filter unit 13 to have a transfer function of $Php(t)^{-}\cdot Bhm(t)(=IRpm(t))$. The transfer function IRpm(t) represents, for example, characteristics shown in FIG. 4.

FIG. 4 illustrates a frequency response of the transfer function IRpm(t) at a specific time ($t=\alpha$) according to an embodiment of the invention. A spectrum AG shown in FIG. 4 represents a frequency response for reproducing resonance of an acoustic guitar. A spectrum CB represents a frequency response for reproducing resonance of a contrabass, as an example for comparison with the acoustic guitar. The following is a description of the frequency response of the acoustic guitar.

As shown in FIG. 4, the frequency response has a plurality of characteristic peaks (two peaks f1 and f2 in this example) corresponding to resonant sound of the body of the acoustic guitar. The peaks f1 and f2 appear as the plurality of characteristic peaks in a specific frequency range of low-pitched audio frequencies (for example, a range of about 50 Hz to 350 Hz). In this example, the waveforms of the peaks f1 and f2 are present at frequencies of about 110 Hz and 200 Hz, respectively. The peaks f1 and f2 result from the occurrence of Helmholtz resonance due to the influence of the shape of the body, and the sound hole, and the like. The frequency response for reproducing resonance of the contrabass also has peaks corresponding to the peaks f1 and f2 although the peak waveforms are present at frequencies different from the peaks f1 and f2.

Figure 5:
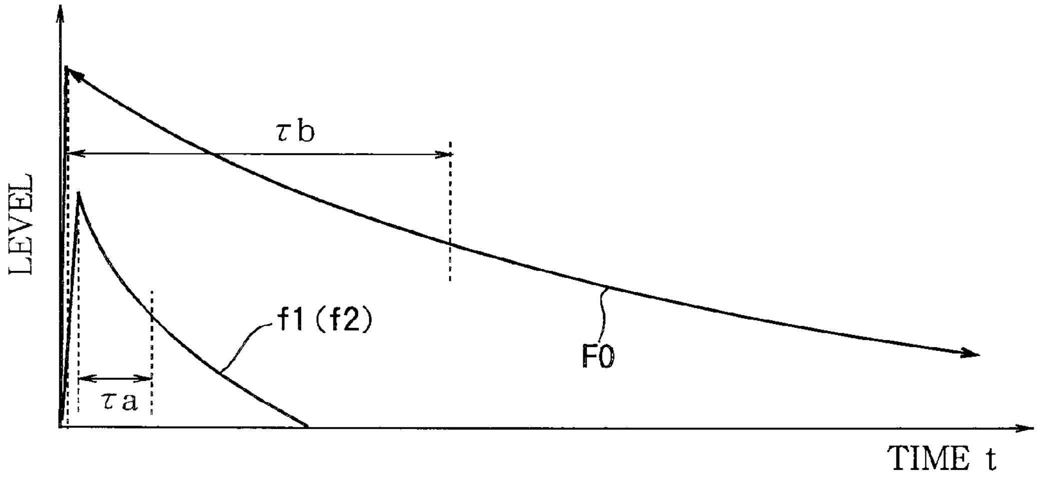
FIG. 5 illustrates the difference between decay of the component of a peak f1 of a signal obtained by performing convolution operation according to an embodiment of the invention and decay of the component of a fundamental sound F0 of a string.

The transfer function IRpm(t) changes with time such that the signal (i.e., the audio data Sf) obtained by performing corresponding convolution operation has characteristics as shown in FIG. 5.

FIG. 5 illustrates the difference between decay of the component of the peak f1 of the signal (i.e., the audio data Sf) obtained by performing convolution operation according to an embodiment of the invention and decay of the component of the fundamental sound F0 of the string. In FIG. 5, "f1 (f2)" represents change of the component of a peak f1 (f2) of the frequency response shown in FIG. 4 with respect to time among the components of sound represented by the audio data Sf. "F0" represents change of the component of the fundamental sound F0, which is one of the components of frequencies generated when the string 2 vibrates, with respect to time among the components of sound represented by the audio data Sf. As shown in FIG. 5, the component of the peak f1 (f2) decays more rapidly than the component of the fundamental sound F0. That is, the decay time $\tau a$ of the peak f1 (f2) is shorter than the decay time $\tau b$ of the component of the fundamental sound F0. The decay time of a component is the time required for the component to fall from the peak value of the component to a specific percent of the peak value. Although the fundamental sound F0 is used as a component to be compared, the same may be applied to other harmonic frequency components. Here, all harmonic components need not be used as a component to be compared. For example, a specific harmonic component, for example, the 2nd or 3rd harmonic component may be used as a reference component to be compared. It may also be possible to assume that non-harmonic components other than the component of the peak f1 (f2) also decay more rapidly than the harmonic component.

As described above, the transfer function IRpm(t) changes with time such that the audio data Sf that the filter unit 13 outputs by performing convolution operation using the transfer function IRpm(t) has the characteristics shown in FIG. 5. Similar to the transfer function IRpm(t), the transfer function Bhm(t) changes with time such that audio data Sf obtained by performing convolution operation using the transfer function Bhm(t) has the characteristics shown in FIG. 5. The product (i.e., the transfer function IRpm(t)) of the transfer function $Php(t)^{-1}$ and the transfer function Bhm(t) also changes with time so as to have the characteristics shown in FIG. 5.

Figure 6:
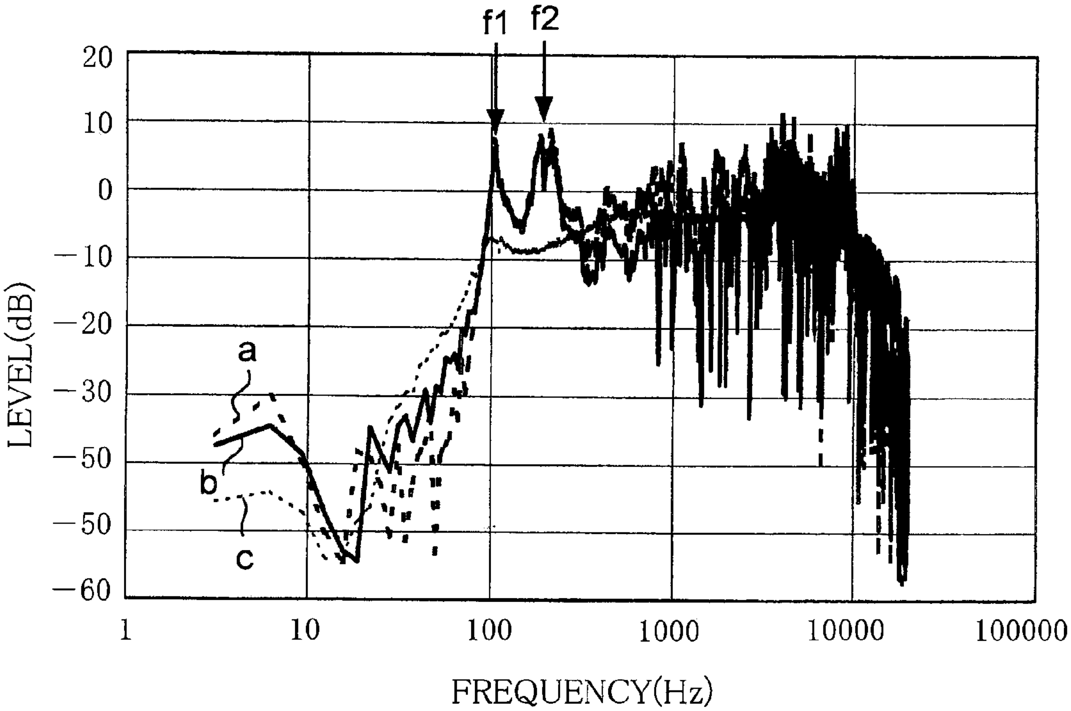
FIG. 6 illustrates a frequency response of a signal obtained through convolution operation according to an embodiment of the invention.

FIG. 6 illustrates a frequency response of a signal (i.e., the audio data Sf) obtained through convolution operation according to an embodiment of the invention. A spectrum "c" shown in FIG. 6 represents a frequency response of the audio signal Sin output from the pickup 3. A spectrum "a" represents a frequency response of a signal obtained through only the FIR filter B 132, i.e., obtained by performing convolution operation using the transfer function Bhm(t) without performing convolution operation using the inverse function Php $(t)^{-1}$ of the transfer function of a vibration generated from the string 2 of the guitar 1 until the vibration is output as the audio signal Sin from the pickup 3. A spectrum "b" represents a frequency response of a signal obtained by performing convolution operation on the spectrum "c" through both the FIR filter A 131 and the FIR filter B 132, i.e., by performing convolution operation using the composite transfer function IRpm(t). The spectrum "a" and the spectrum "b" differ in a high frequency band above several kHz and in a low frequency band lower than the peaks f1 and f2. This difference depends on whether or not convolution operation has been performed using $Php(t)^{-1}$.

Namely, the FIR filter B 132 convolutes the input audio data Sd with the transfer function Bhm(t) to impart the frequency response as depicted by the spectrum a to the output audio data Sf developing a plurality of peak waveforms f1 and f2 corresponding to resonance of the body of another stringed instrument different from the stringed instrument 1 within a specific frequency range. Further, the FIR filter A 131 convolutes the input audio data Sd with the inverse function $Php(t)^{-1}$ so as to impart the frequency response as depicted by the spectrum b to the output audio data Sf.

Referring back to FIG. 2, the storage unit 15 is a storage means such as a nonvolatile memory and stores setting information described above. When the storage unit 15 has acquired information associated with a transfer function corresponding to a model of a guitar from the interface 6, the storage unit 15 registers the acquired information in the setting information. The interface 6 need not be provided when there is no need to register new information in the setting information table in this manner.

The output unit 16 acquires the audio data Se and the audio data Sfe, converts each of the audio data Se and the audio data Sef from digital to analog, amplifies the two analog audio signals by respective amplification factors (i.e., gains) set for the audio data Se and the audio data Sef, adds the amplified audio signals, and then outputs the resulting signal as an audio signal Sout to the terminal of the guitar 1. Thus, the output unit 16 provides the audio signal Sout to the sound emitter 100 connected to the terminal.

The amplification factors are set as the user specifies by manipulating the manipulation unit 5. Here, when one of the audio data Se and the audio data Sef is set to be excluded from the audio signal Sout, the output unit 16 may set the amplification factor of the audio signal produced through conversion of the audio data to "0". In addition, components provided in a path for performing processes on the audio data may be set to be disabled.

The above is a description of the configuration of the signal processing device 10.

The guitar 1 of the embodiment of the invention can output the audio signal Sout after adding resonant sound of the body or the like of a guitar of a different model to the audio signal Sout by performing convolution operation on the audio signal Sin output from the pickup 3 through the filter unit 13 in the above manner. Here, it is possible to improve accuracy of reproduction of the resonance of the body of the guitar of the different model since the transfer function of the filter unit 13 has a frequency response, in which peaks f1 and f2 corresponding to resonance of the body in the guitar of the different model appear, and the components of the peaks f1 and f2 decay more rapidly than the component of a fundamental sound of the vibration of the string 2 in the signal obtained through convolution operation using the transfer function.

In addition, it is possible to further improve accuracy of reproduction of the resonant sound of the body or the like of the guitar of the different model, compared to when convolution operation is performed simply on the audio signal Sin (audio data Sd) output from the pickup 3, since the transfer function of the filter unit 13 is determined using the inverse function of the transfer function of a vibration generated from the string 2 of the guitar 1 until the vibration is output as the audio signal Sin from the pickup 3.

[Frequency Distribution Comparison]

A frequency distribution when a first string (E) of an actual acoustic guitar is plucked and a frequency distribution when a first string (E) of the guitar 1 is plucked (with and without convolution operation through the filter unit 13) are compared in the following description. First, the case of the acoustic guitar is described with reference to FIGS. 7 and 8.

Figure 7A:
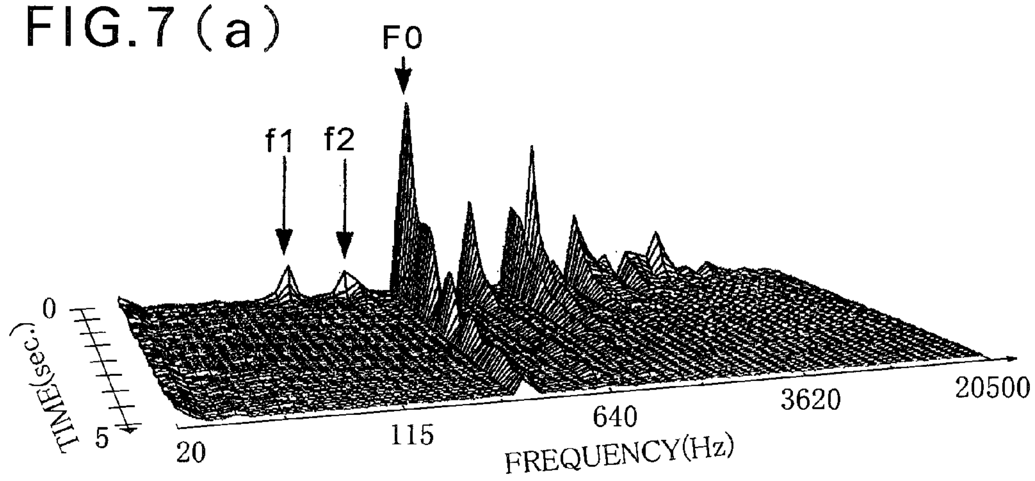
FIGS. 7(*a*) to 7(*c*) illustrate change of the frequency distribution with respect to time when a first string (E) of an acoustic guitar is plucked.
Figure 7B:
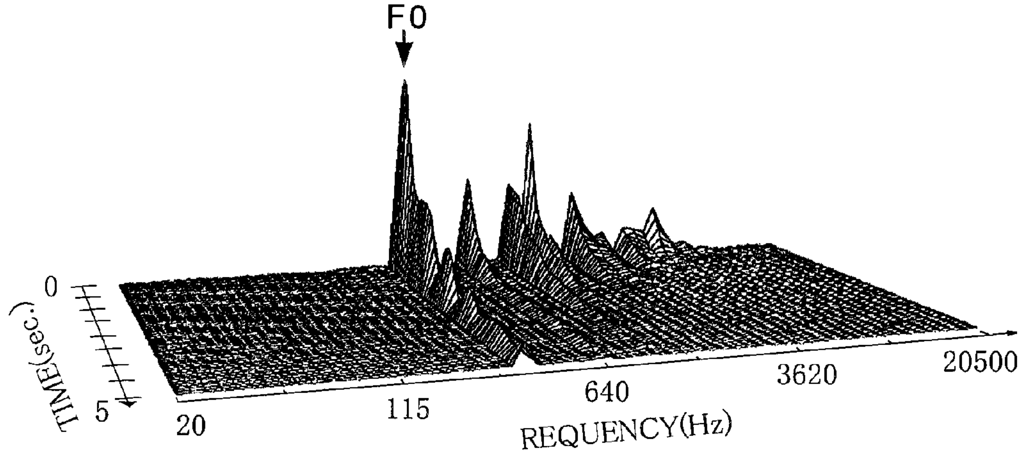
Figure 7C:
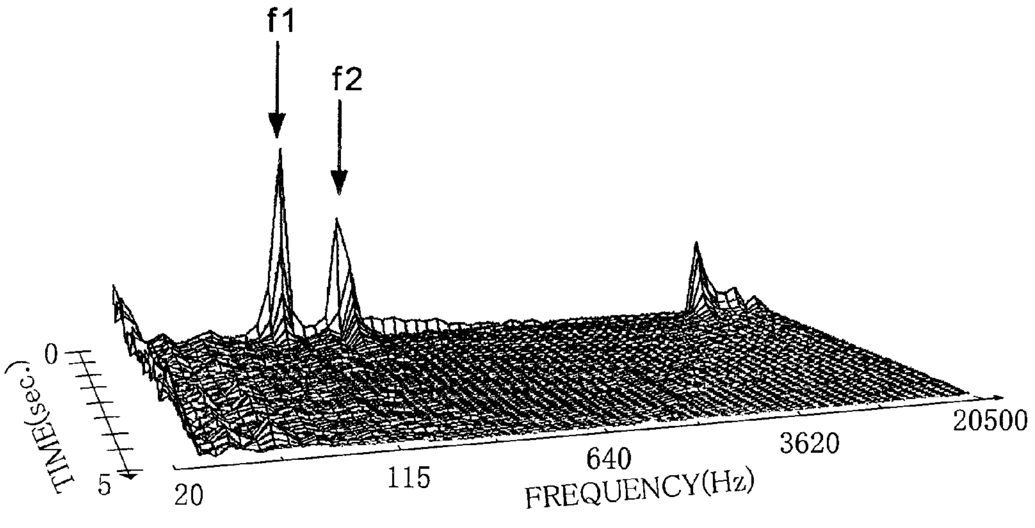

FIGS. 7(*a*) to 7(*c*) illustrate change of the frequency distribution with respect to time when the first string (E) of the acoustic guitar is plucked. This frequency distribution is a frequency distribution of an audio signal that a microphone produces by receiving sound of the acoustic guitar. A frequency axis, a time axis, and a signal level axis are shown in each of FIGS. 7(*a*) to 7(*c*). Since the signal level axes are appropriately scaled, peaks of equal height have different signal levels in FIGS. 7(*b*) and 7(*c*).

FIG. 7(*a*) illustrates the entire frequency distribution of the audio signal produced by receiving sound of the acoustic guitar. FIG. 7(*b*) illustrates a frequency distribution of components of a fundamental sound F0 and harmonic components thereof extracted from the frequency distribution shown in FIG. 7(*a*). FIG. 7(*c*) illustrates a frequency distribution of components, other than the fundamental sound F0 and the harmonic components thereof, extracted from the frequency distribution shown in FIG. 7(*a*). That is, FIG. 7(*c*) illustrates a frequency distribution of the resonance component of the acoustic guitar. Characteristic peaks f1 and f2 appear in this frequency distribution. Thus, the frequency distribution shown FIG. 7(*a*) is the sum of the frequency distribution shown FIG. 7(*b*) and the frequency distribution shown FIG. 7(*c*).

Figure 8A:
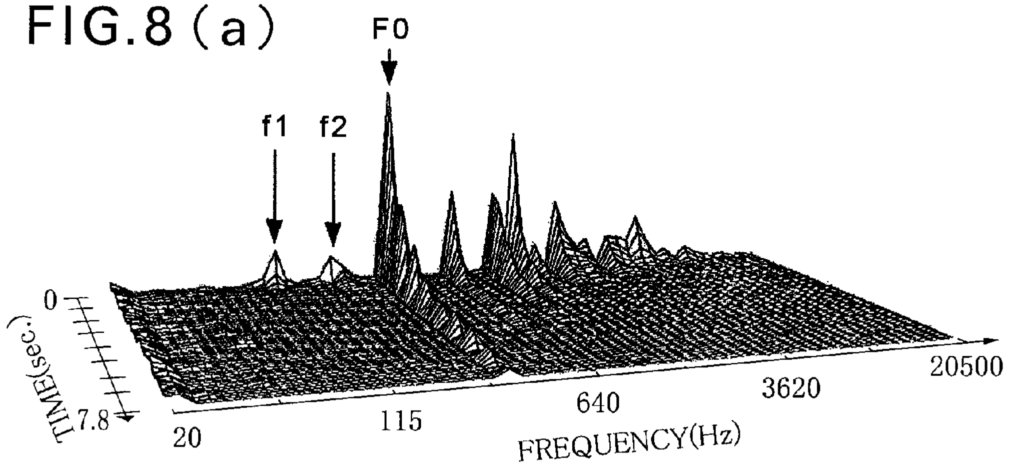
FIGS. 8(*a*) to 8(*c*) illustrate change of the frequency distribution with respect to time when the first string (E) of the acoustic guitar is plucked.
Figure 8B:
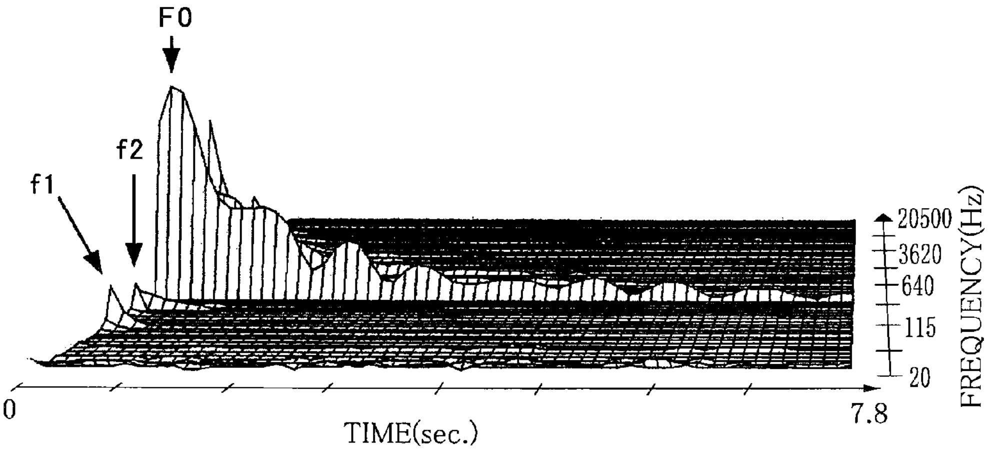
Figure 8C:
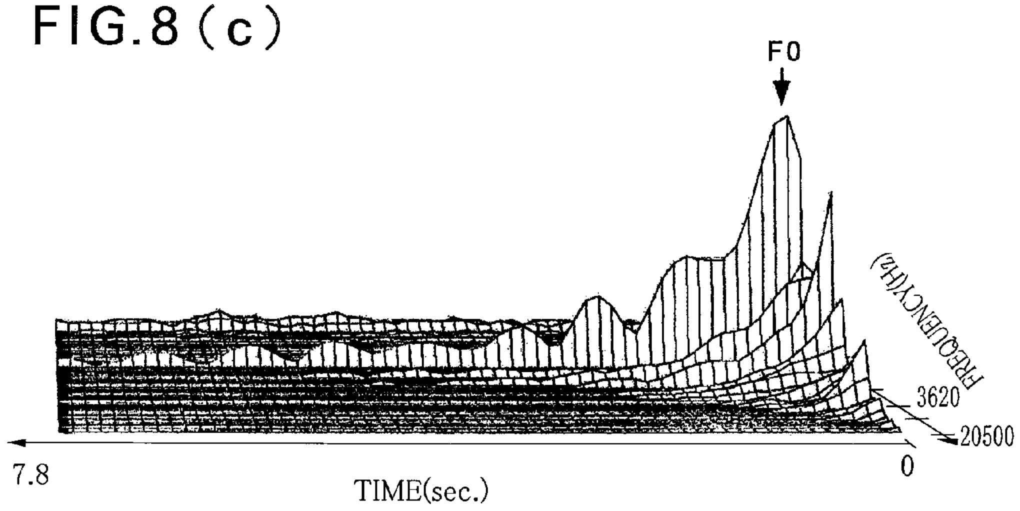

FIGS. 8(*a*) to 8(*c*) illustrate change of the frequency distribution with respect to time when the first string (E) of the acoustic guitar is plucked. FIG. 8(*a*) corresponds to FIG. 7(*a*) with the difference being the length of the time axis. FIG. 8(*b*) illustrates change of the frequency distribution with respect to time of FIG. 8(*a*) when viewed from the low frequency side. FIG. 8(*c*) illustrates change of the frequency distribution with respect to time of FIG. 8(*a*) when viewed from the high frequency side.

As shown in FIG. 8(*b*), the components of the peaks f1 and f2 decay more rapidly than the component of the fundamental sound F0. In the invention, the degree of the decay of the components of the peaks f1 and f2 is determined taking into consideration that the decay of the components of the peaks f1 and f2 greatly affect the feeling of resonance of the body.

Next, the difference of the frequency distribution when the first string (E) of the guitar 1 is plucked in the case where convolution operation is performed through the filter unit 13 and in the case where convolution operation is not performed through the filter unit 13 is described with reference to FIGS. 9 and 10.

Figure 9:
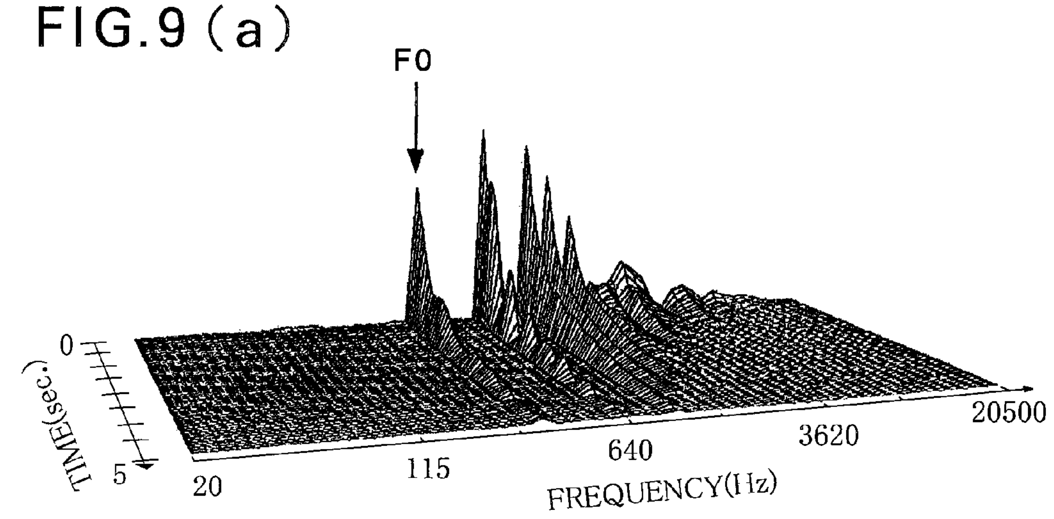
FIGS. 9(*a*) to 9(*c*) illustrate change of the frequency distribution with respect to time when the first string (E) of the guitar is plucked in the case where convolution operation is not performed.
Figure 9:
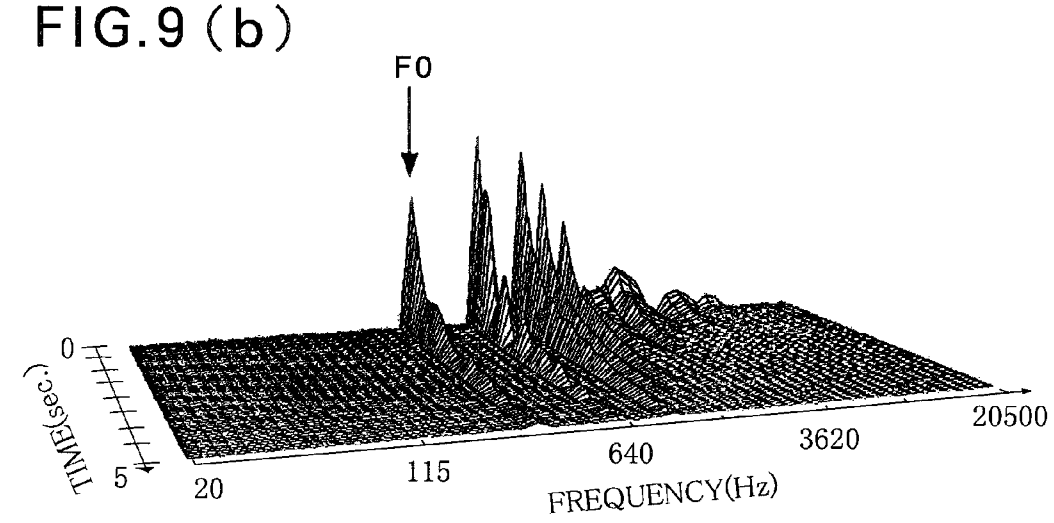
Figure 9:
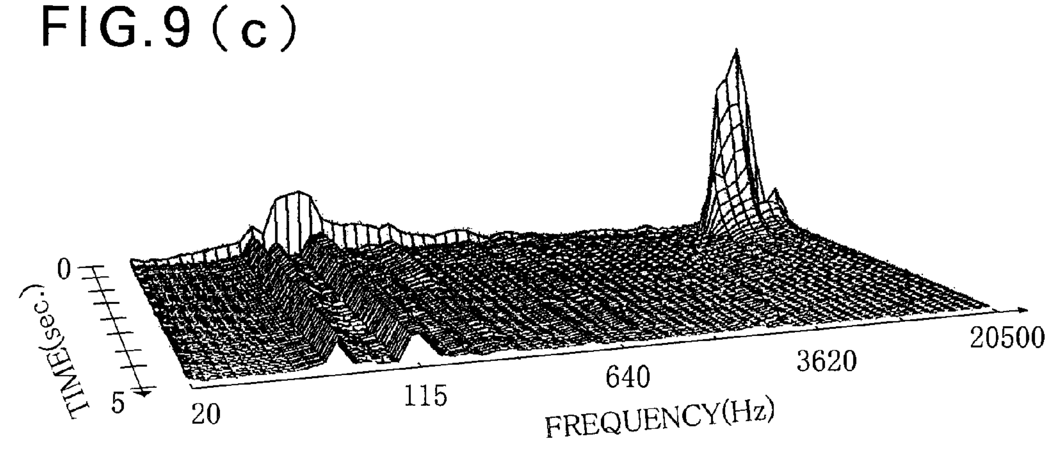

FIGS. 9(*a*) to 9(*c*) illustrate change of the frequency distribution with respect to time when the first string (E) of the guitar 1 is plucked in the case where convolution operation is not performed. This frequency distribution is a frequency distribution of an audio signal Sin (audio data Sd) output from the pickup 3 of the guitar 1. FIGS. 9(*a*), 9(*b*), and 9(*c*) correspond respectively to FIGS. 7(*a*), 7(*b*), and 7(*c*). The peaks f1 and f2, which appear in the frequency distribution of FIG. 7(*c*), do not appear in this frequency distribution as shown in FIG. 9(*c*). Small resonance components appear in the low frequency band since the pickup 3 picks up vibration of the fifth and sixth strings which resonate due to vibration of the first string. Although there is a possibility that such resonance components are included in the frequency distribution of FIG. 7(*c*), the resonance components do not clearly appear in the frequency distribution since the signal levels of the resonance components are much smaller than the signal levels of the peaks f1 and f2.

Figure 10:
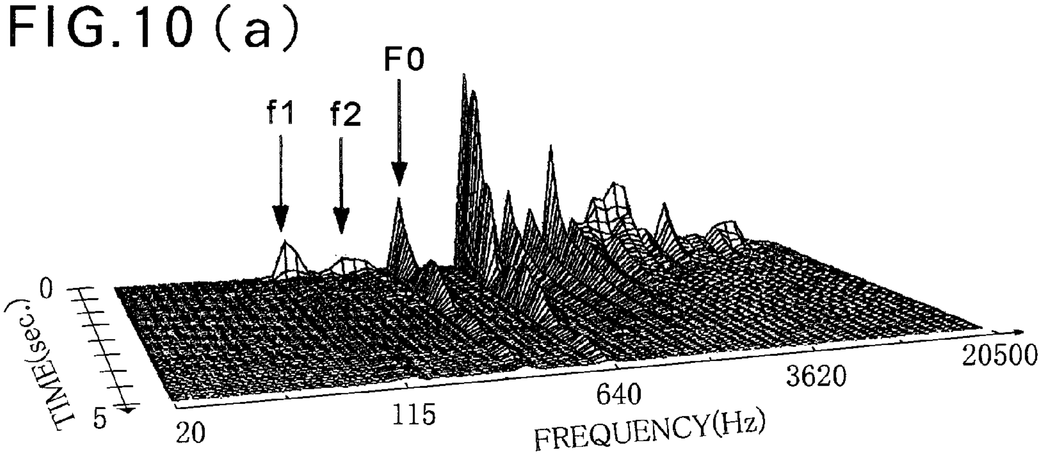
FIGS. 10(*a*) to 10(*c*) illustrate change of the frequency distribution with respect to time when the first string (E) of the guitar is plucked in the case where convolution operation is performed.
Figure 10:
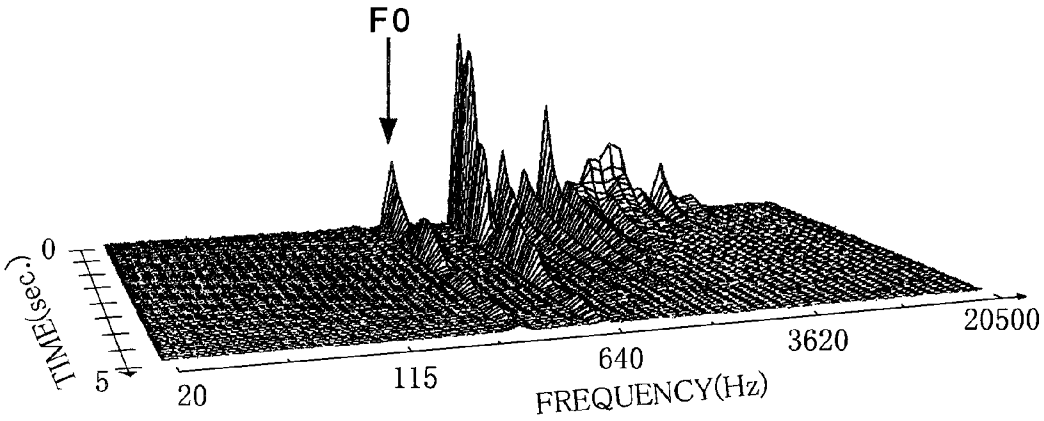
Figure 10:
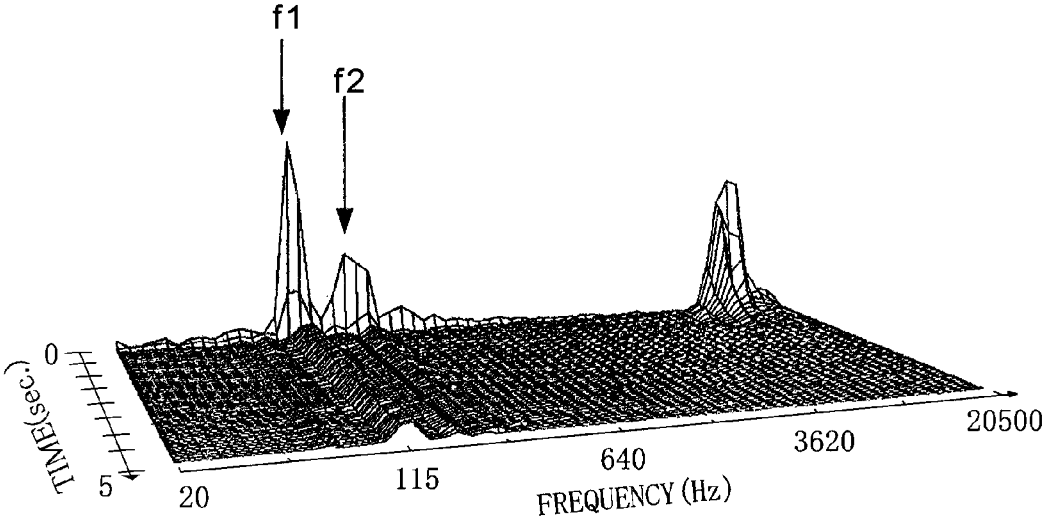

FIGS. 10(*a*) to 10(*c*) illustrate change of the frequency distribution with respect to time when the first string (E) of the guitar 1 is plucked in the case where convolution operation is performed. This frequency distribution is a frequency distribution of the audio data Sf output from the filter unit 13 of the guitar 1. FIGS. 10(*a*), 10(*b*), and 10(*c*) correspond respectively to FIGS. 9(*a*), 9(*b*), and 9(*c*). The peaks f1 and f2, which appear in the frequency distribution of FIG. 7(*c*), also appear in this frequency distribution as shown in FIG. 10(*c*).

Performing convolution operation on the audio signal Sin through the filter unit 13 in this manner results in the addition of a resonance component as shown in FIG. 10(*c*) having the characteristics shown in FIG. 7(*c*). Accordingly, the audio signal Sout output from the guitar 1 can accurately reproduce the resonance of the body of the acoustic guitar shown in FIG. 7.

<Modifications>

Although the embodiment of the invention has been described above, the invention can provide various other modifications as described below.

[Modification 1]

Although the filter unit 13 includes the FIR filter A 131 and the FIR filter B 132 that are connected in series in the above embodiment, the filter unit 13 may also be constructed as a single FIR filter or the like. In this case, the setting unit 14 may calculate the composite transfer function IRpm(t) based on both the transfer function $Php(t)^{-1}$ and the transfer function Bhm(t) and may set filter coefficients corresponding to the composite transfer function IRpm(t) in the filter unit 13.

In this case, the content of the setting information stored in the storage unit 15 may be different from that of the above embodiment as shown in FIG. 11.

FIG. 11 illustrates a table of setting information in Modification 1 of the invention. A transfer function IRpm(t), which is different from that of the above embodiment and is previously calculated in association with a model different from the guitar 1 using the method of the embodiment, is registered in the table of setting information of Modification 1. In this case, the setting unit 14 need only read the transfer function IRpm(t) corresponding to a desired model specified by the user and thus does not need to perform a process for calculating the transfer function IRpm(t) based on the transfer function $Php(t)^{-1}$ and the transfer function Bhm(t).

[Modification 2]

Although the transfer functions Bhm(t) and IRpm(t) are set so as to satisfy conditions that the peaks f1 and f2 appear in the transfer functions Bhm(t) and IRpm(t), and the components of the peaks f1 and f2 decay more rapidly than the frequency components of vibration of the string 2 in the signal obtained through convolution operation, these conditions need not necessarily be satisfied.

Also in this case, it is possible to perform convolution operation through the FIR filter B 132 on a signal corresponding to extracted vibration components of the string 2 of the guitar 1 due to presence of the transfer function $Php(\mathbf{1})^{-1}$ set in the FIR filter A 131, and therefore it is possible to further improve accuracy of reproduction of acoustic effects of resonance even when the resonance to be imparted is not body resonance. This makes it possible to reproduce acoustic effects of a stringed instrument whose resonance does not have the frequency response having peaks f1 and f2.

[Modification 3]

Although the signal processing device 10 is a part of the guitar 1 in the above embodiment, the signal processing device 10 need not be a part of the guitar 1. In this case, the signal processing device 10 may include an input terminal for acquiring the audio signal Sin and components corresponding to the manipulation unit 5 and the interface 6. The setting information stored in the storage unit 15 may also register information associated with transfer functions $Php(t)^{-1}$ in association with guitars of a plurality of models.

In this configuration, the user specifies a model of a guitar, which provides the audio signal Sin to the signal processing device 10, by manipulating the manipulation unit 5. Accordingly, the setting unit 14 sets filter coefficients corresponding to a transfer function $Php(t)^{-1}$ of the specified model in the FIR filter A 131. As illustrated in the above embodiment, when the user specifies a model of a guitar having resonance that the user desires to reproduce, the setting unit 14 sets filter coefficients corresponding to the transfer function Bhm(t) of the specified model in the FIR filter B 132.

Accordingly, the user can play various guitars using the signal processing device 10 so that it is possible to output a sound reproducing the resonance of a guitar of a model different from the guitar 1.

[Modification 4]

Although the guitar 1 has been described as an example of a stringed instrument in the above embodiment, the stringed instrument need not be a plucking stringed instrument such as the guitar. The stringed instrument may be any type which uses a string as a sound source, for example, a bowed instrument such as a violin and a keyboard instrument such as a piano. The stringed instrument may include an output means that converts a vibration propagated from a string into an electrical signal and outputs the electrical signal, similar to the pickup 3.

Any of a variety of stringed instruments other than the guitar may be applied as the stringed instrument whose resonant sound the user desires to reproduce. A transfer function Bhm(t) for the stringed instrument, which the user desires to apply, may be previously calculated using the calculation method described in the above embodiment.

In this modification, the signal processing device 10 can output an audio signal Sout of sound having a resonant sound similar to the resonant sound of a cello while the user plays a violin by acquiring an audio signal Sin output as the user plays the violin and performing convolution operation through the filter unit 13 using a transfer function for reproducing the resonance of the body of the cello. In addition, even when the violin is a stringed instrument such as an electric violin that does not have a body, it is possible to reproduce body resonance of a stringed instrument having a body. Here, it is possible to further improve accuracy of reproduction of the resonant sound by performing convolution operation using filter coefficients corresponding to a transfer function including the transfer function $Php(t)^{-1}$.

What is claimed is:

1. A signal processing device comprising:

a signal acquisition unit for acquiring a signal corresponding to a vibration propagated from a string attached to a stringed instrument from an output element for outputting the signal corresponding to the vibration; and a signal processing unit including a filter unit for performing convolution operation using a first filter coefficient and a second filter coefficient set in the filter unit, the signal processing unit for applying the convolution operation to the acquired signal through the filter unit and for outputting a processed signal, the first filter coefficient corresponding to an inverse function of a transfer function of the vibration observed while the vibration is generated by the string and outputted as the signal from the output element, thereby enabling the filter unit to suppress signals other than vibration components of the string, the second filter coefficient corresponding to another transfer function which has a frequency response developing a plurality of peak waveforms corresponding to resonance of a body of another stringed instrument different from the stringed instrument, wherein said another transfer function is calculated based on analysis of a sound received by a microphone positioned relative to said another stringed instrument, the received sound generated from a striking of a bridge part of said another stringed instrument.

2. The signal processing device according to claim 1, comprising:

an information acquisition unit for acquiring first information associated with an inverse function of a transfer function of the vibration observed while the vibration is generated by the string and outputted as the signal from the output element, and for acquiring second information associated with a transfer function of a sound which is generated by a string of another stringed instrument different from the stringed instrument and which is received after undergoing resonance of said another stringed instrument; and a setting unit for calculating a transfer function based on the first information and the second information acquired by the information acquisition unit and for setting the first and second filter coefficients corresponding to the calculated transfer function in the filter unit, the calculated transfer function having a frequency response developing a plurality of peak waveforms corresponding to resonance of the body of said another stringed instrument different from the stringed instrument within a specific frequency range, and allowing components of the peak waveforms to decay more rapidly than a component of a fundamental sound in the vibration of the string in the processed signal.

3. A signal processing device comprising:

a signal acquisition unit for acquiring a signal corresponding to a vibration propagated from a string attached to a stringed instrument from an output element for outputting the signal corresponding to the vibration;

a signal processing unit including a filter unit for performing convolution operation using a first filter coefficient and a second filter coefficient set in the filter unit, the signal processing unit for applying the convolution operation to the acquired signal through the filter unit, and for outputting a processed signal;

an information acquisition unit for acquiring first information associated with an inverse function of a transfer function of the vibration observed while the vibration is generated by the string and outputted as the signal from the output element, and for acquiring second information associated with another transfer function of a sound observed while the sound is generated by a string of another stringed instrument different from the stringed instrument and received after undergoing resonance of said another stringed instrument, wherein said another transfer function is calculated based on analysis of a sound received by a microphone positioned relative to said another stringed instrument, the received sound generated from a striking of a bridge part of said another stringed instrument; and a setting unit for calculating a transfer function based on the first information and the second information acquired by the information acquisition unit and for setting the first and second filter coefficients corresponding to the calculated transfer function in the filter unit, the transfer function enabling the filter unit to suppress signals other than vibration components of the string and allowing the signal processing unit to output the processed signal reproducing a sound that has undergone resonance of said another stringed instrument.

4. The signal processing device according to claim 3, comprising a storage unit for storing the first information, the information acquisition unit for acquiring the first information from the storage unit.

5. A signal processing device comprising:

a signal acquisition unit for acquiring a signal corresponding to a vibration propagated from a string attached to a stringed instrument from an output element for outputting the signal corresponding to the vibration;

a signal processing unit including a filter unit for performing convolution operation using a first filter coefficient and a second filter coefficient set in the filter unit, the first filter coefficient corresponding to an inverse function of a transfer function of the vibration observed while the vibration is generated by the string and outputted as the signal from the output element and being effective to suppress signals other than vibration components of the string in the acquired signal, the signal processing unit for applying the convolution operation to the acquired signal through the filter unit and for outputting a processed signal;

an information acquisition unit for acquiring information associated with another transfer function of a sound observed while the sound is generated by a string of another stringed instrument different from the stringed instrument and received after undergoing resonance of said another stringed instrument, wherein said another transfer function is calculated based on analysis of a sound received by a microphone positioned relative to said another stringed instrument, the received sound generated from a striking of a bridge part of said another stringed instrument; and a setting unit for setting the second filter coefficient corresponding to the another transfer function acquired by the information acquisition unit in the filter unit.

6. A stringed instrument comprising:

a string;

an output element for outputting a signal corresponding to a vibration propagated from the string; and a signal processing unit including a filter unit for performing convolution operation using a first filter coefficient and a second filter coefficient set in the filter unit, the signal processing unit for applying the convolution operation to the signal through the filter unit and for outputting a processed signal, the first filter coefficient corresponding to an inverse function of a transfer function of the vibration observed while the vibration is generated by the string and outputted as the signal from the output element, thereby enabling the filter unit to suppress signals other than vibration components of the string, the second filter coefficient corresponding to another transfer function which has a frequency response developing a plurality of peak waveforms corresponding to resonance of a body of another stringed instrument different from the stringed instrument, wherein said another transfer function is calculated based on analysis of a sound received by a microphone positioned relative to said another stringed instrument, the received sound generated from a striking of a bridge part of said another stringed instrument.

7. A stringed instrument comprising:

a string;

an output element for outputting a signal corresponding to a vibration propagated from the string;

a signal processing unit including a filter unit for performing convolution operation using a first filter coefficient and a second filter coefficient set in the filter unit, the signal processing unit for applying the convolution operation to the signal through the filter unit, and for outputting a processed signal;

an information acquisition unit for acquiring first information associated with an inverse function of a transfer function of the vibration observed while the vibration is generated by the string and outputted as the signal from the output element, and for acquiring second information associated with another transfer function of a sound observed while the sound is generated by a string of another stringed instrument different from the stringed instrument and received after undergoing resonance of said another stringed instrument, wherein said another transfer function is calculated based on analysis of a sound received by a microphone positioned relative to said another stringed instrument, the received sound generated from a striking of a bridge part of said another stringed instrument; and a setting unit for calculating a transfer function based on the first information and the second information acquired by the information acquisition unit and for setting the first and second filter coefficients corresponding to the calculated transfer function in the filter unit, the transfer function enabling the filter unit to suppress signals other than vibration components of the string and allowing the signal processing unit to output the processed signal reproducing a sound that has undergone resonance of said another stringed instrument.

8. A stringed instrument comprising:

a string;

an output element for outputting a signal corresponding to a vibration propagated from the string;

a signal processing unit including a filter unit for performing convolution operation using a first filter coefficient and a second filter coefficient set in the filter unit, the first filter coefficient corresponding to an inverse function of a transfer function of the vibration observed while the vibration is generated by the string and outputted as the signal from the output element and being effective to suppress signals other than vibration components of the string in the signal, the signal processing unit for applying the convolution operation to the signal through the filter unit and for outputting a processed signal;

an information acquisition unit for acquiring information associated with another transfer function of a sound observed while the sound is generated by a string of another stringed instrument different from the stringed instrument and received after undergoing resonance of said another stringed instrument, wherein said another transfer function is calculated based on analysis of a sound received by a microphone positioned relative to said another stringed instrument, the received sound generated from a striking of a bridge part of said another stringed instrument; and a setting unit for setting the second filter coefficient corresponding to the another transfer function acquired by the information acquisition unit in the filter unit.

9. The signal processing device according to claim 1, wherein the filter unit is set with the second filter coefficient which allows components of the peak waveforms to decay more rapidly than a component of a fundamental sound in the vibration of the string in the processed signal.

* * * * *